United States Patent
Parilla

[15] 3,700,171
[45] Oct. 24, 1972

[54] COOLING TECHNIQUES FOR HIGH TEMPERATURE ENGINES AND OTHER COMPONENTS

[72] Inventor: Arthur R. Parilla, 34 Crestview Road, Mountain Lakes, N.J.

[22] Filed: June 26, 1969

[21] Appl. No.: 842,774

Related U.S. Application Data

[60] Continuation of Ser. No. 588,779, Oct. 24, 1966, abandoned, which is a division of Ser. No. 273,265, April 12, 1963, Pat. No. 3,305,178.

[52] U.S. Cl. ............... 239/127.3, 60/39.66, 60/265, 239/265.15
[51] Int. Cl. ............................................. B64d 33/04
[58] Field of Search........239/127.1, 127.3, 128, 132, 239/132.3, 132.5, 265.11, 265.17, 265.43, 265.15; 60/27, 31, 34, 39.66, 264, 265; 244/12, 15, 23, 29, 57, 1 SS; 102/34, 49, 105; 62/239 A, 467

[56] References Cited

UNITED STATES PATENTS

| | | |
|---|---|---|
| 3,122,883 | 3/1964 | Terner...................60/35.6 |
| 3,129,560 | 4/1964 | Prosen...................60/35.6 |
| 3,131,535 | 5/1964 | Hensley..................60/35.6 |
| 3,137,995 | 6/1964 | Othmer et al............60/35.6 |
| 3,145,529 | 8/1964 | Maloof....................60/35.6 |
| 3,151,449 | 10/1964 | Manson..................60/35.6 |
| 3,157,026 | 11/1964 | Lampert..................60/35.6 |
| 3,167,909 | 2/1965 | Thielman.................60/35.6 |
| 3,251,554 | 5/1966 | Kraus...................239/265.15 |
| 3,253,785 | 5/1966 | Watanabe.............239/265.15 |
| 3,289,943 | 12/1966 | Thomas et al. ........239/127.1 |

FOREIGN PATENTS OR APPLICATIONS 1,112,030  11/1955  France.................239/265.15

Primary Examiner—M. Henson Wood, Jr.
Assistant Examiner—Edwin D. Grant
Attorney—Morgan, Finnegan, Durham & Pine

[57] ABSTRACT

Cooling means for a rocket engine nozzle comprising a fusible multi-turn, multi-layer coil of metal surrounding a porous liner in the nozzle and flowing therethrough when melted. Gas bled from the thrust chamber of the rocket engine forces the melted metal coolant through the nozzle liner, the pores of the liner directionally dispersing the coolant over the nozzle liner surface.

5 Claims, 20 Drawing Figures

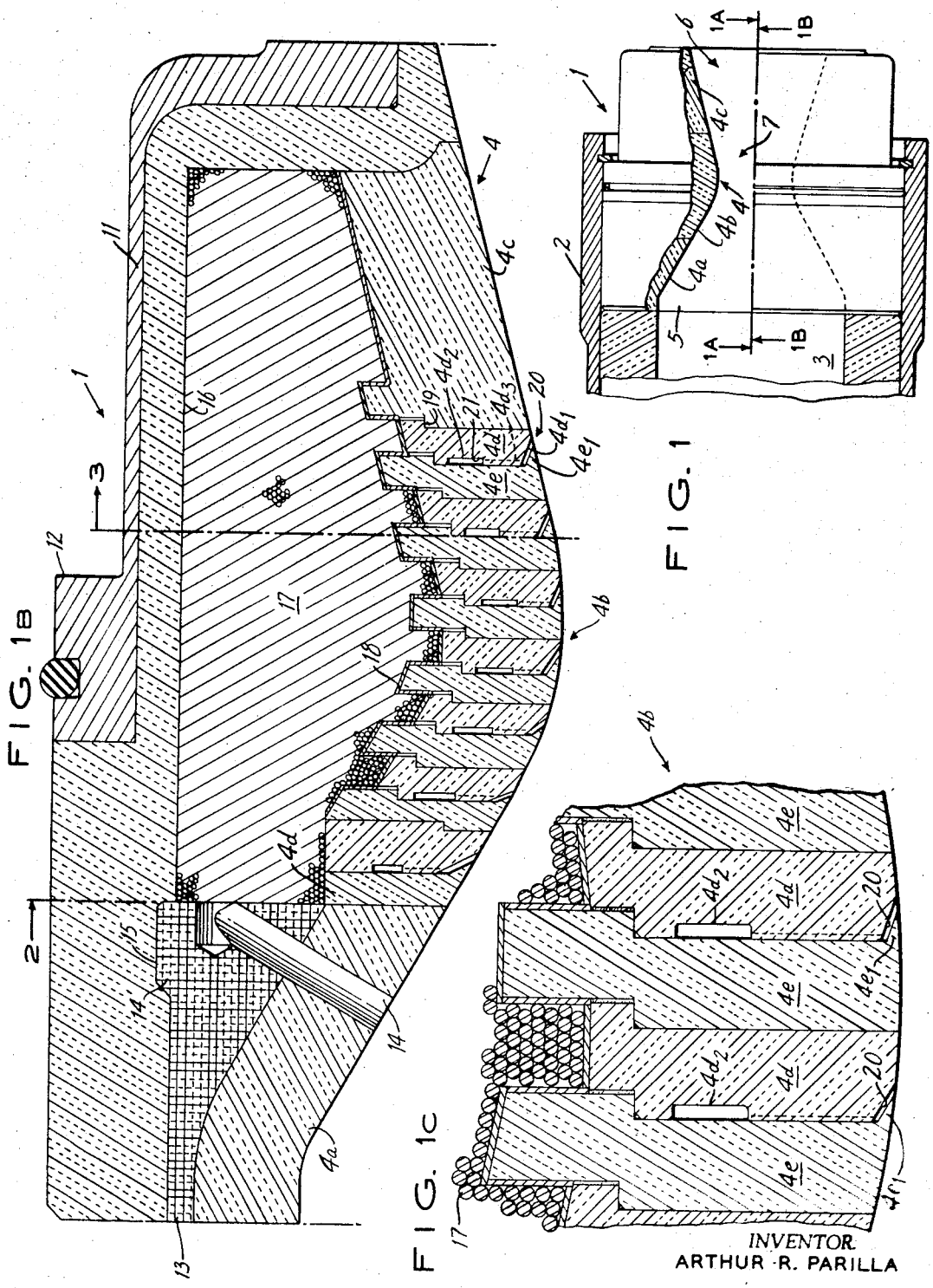

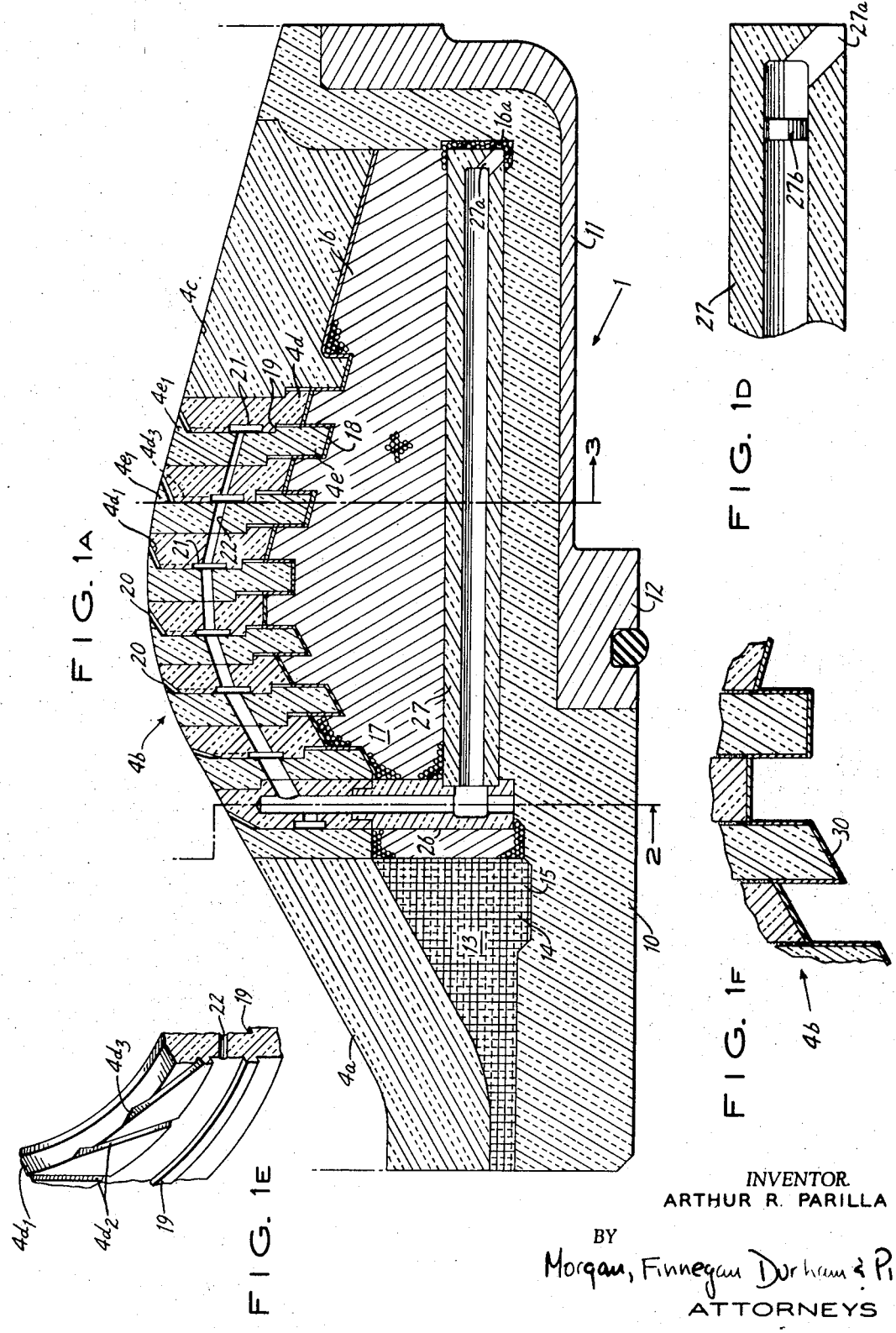

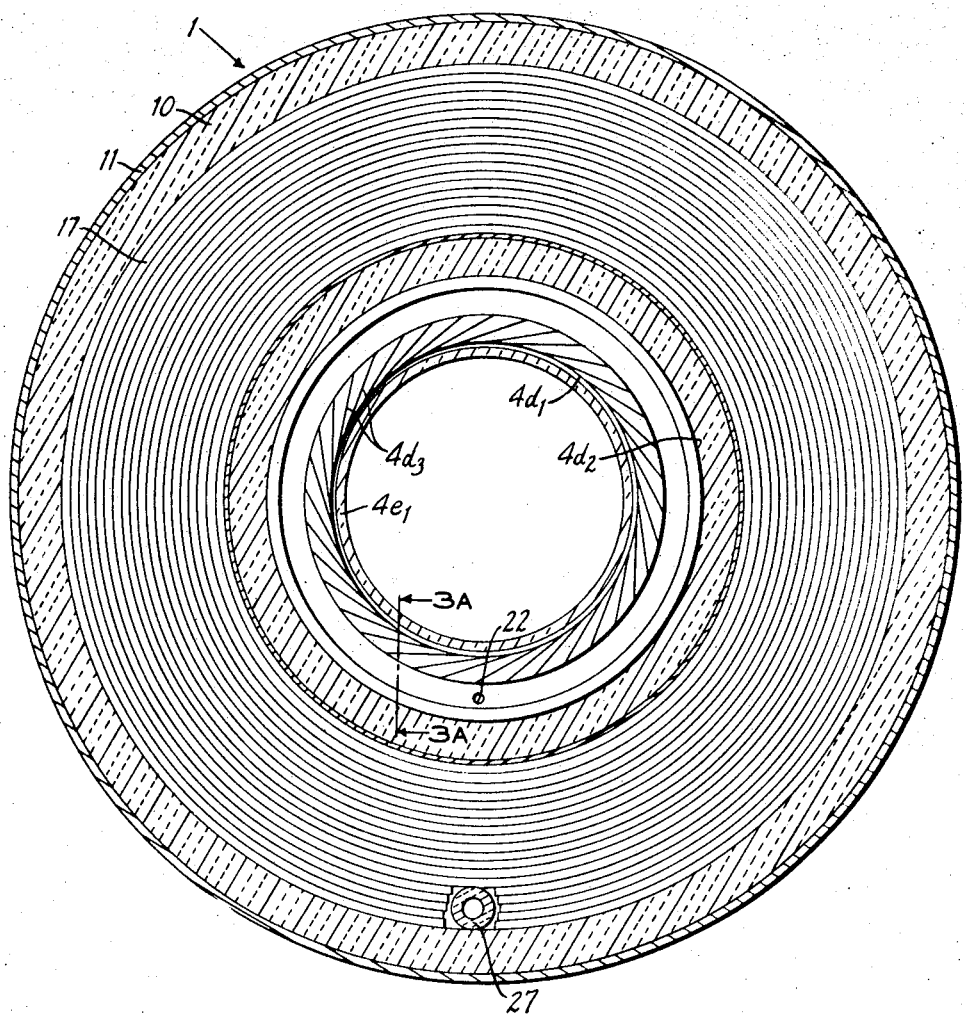
FIG. 3
FIG. 3A
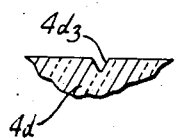

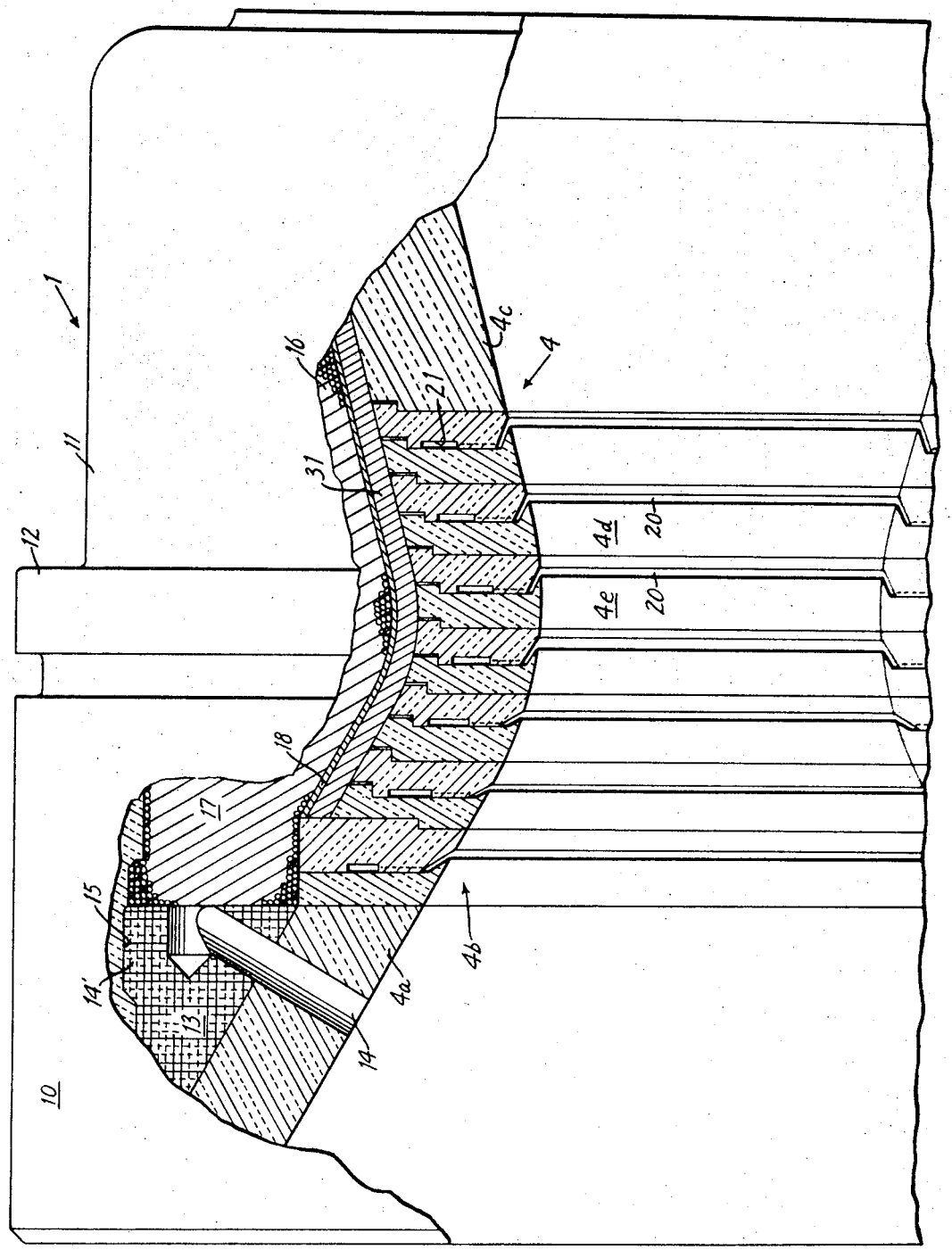

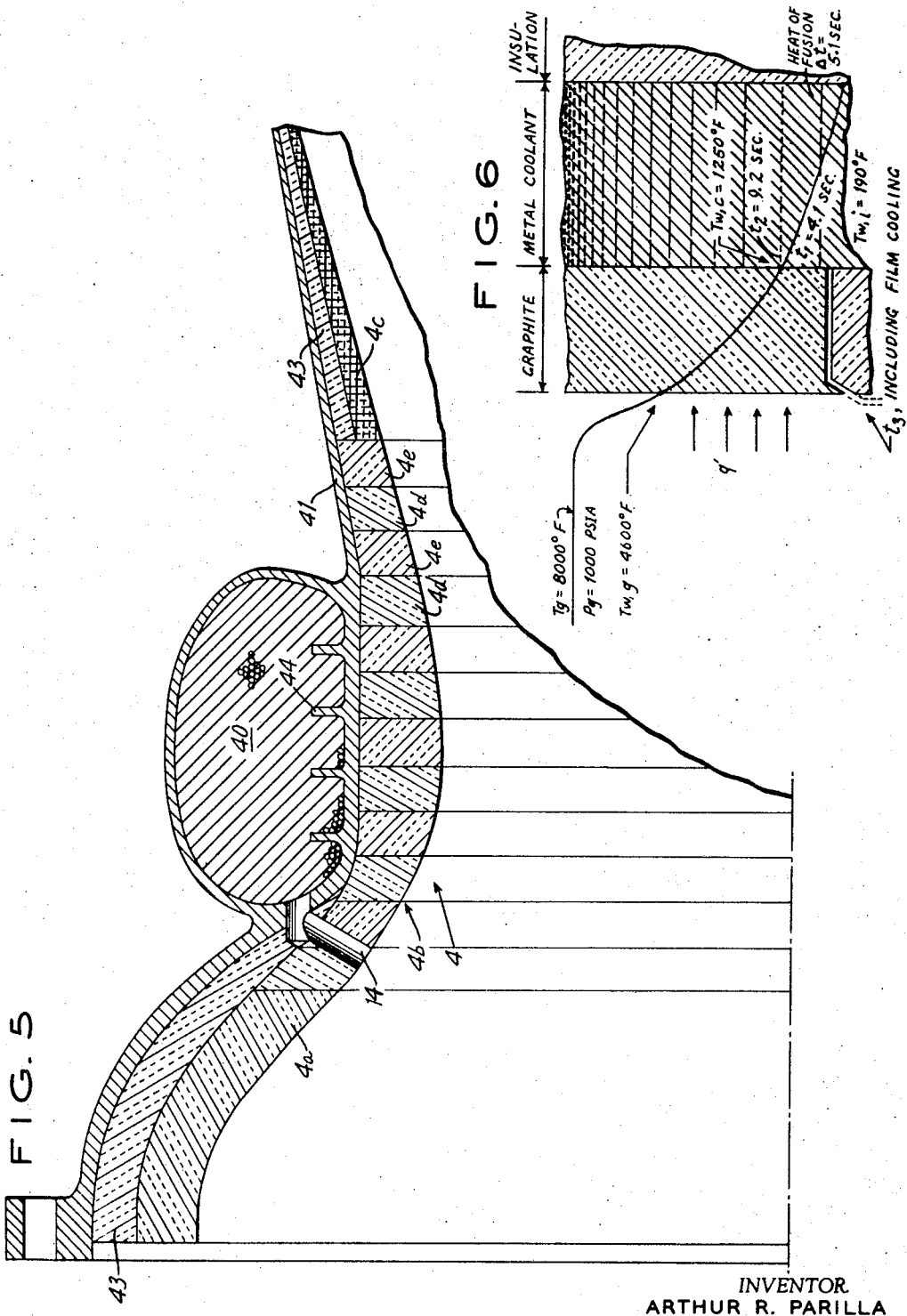

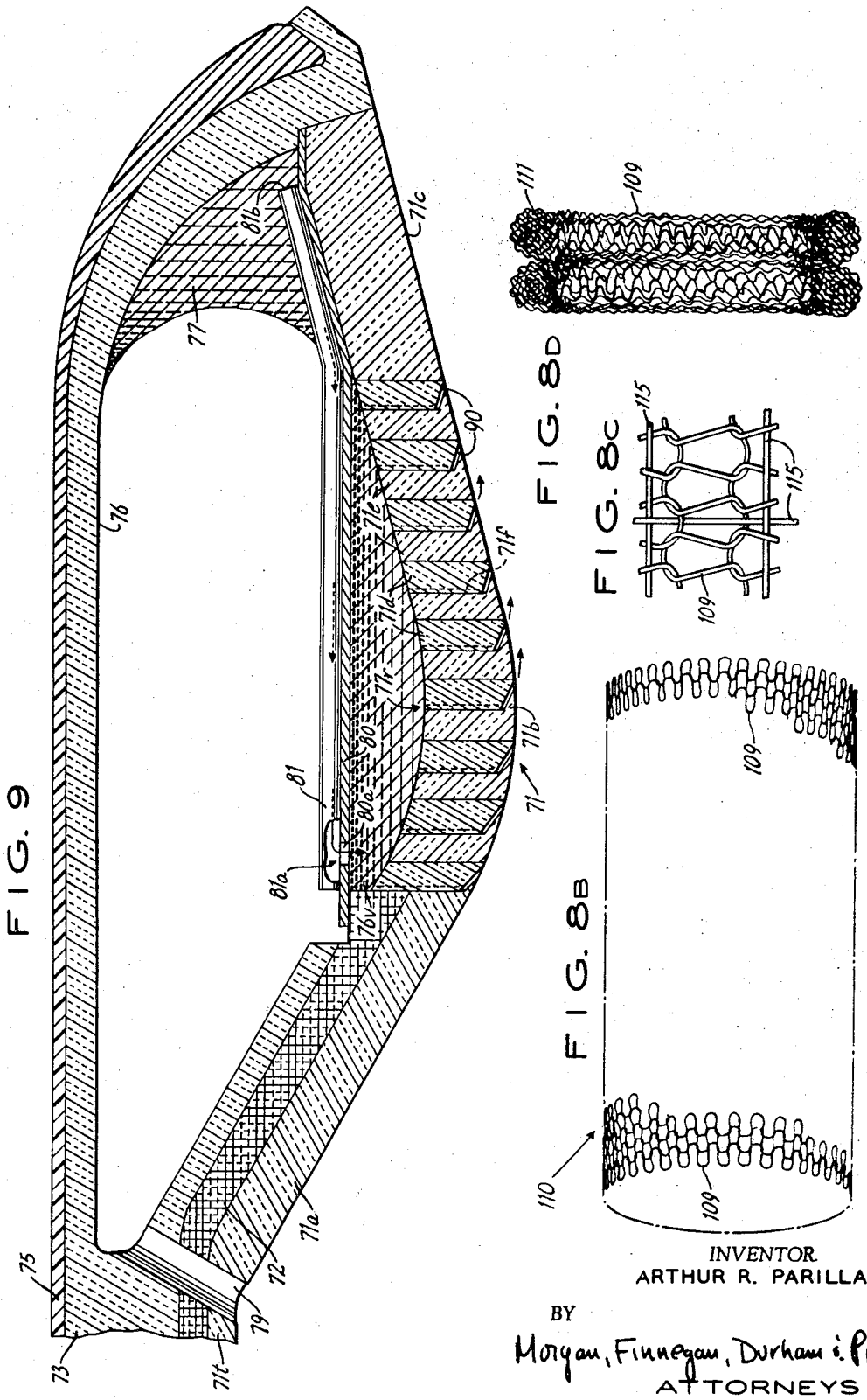

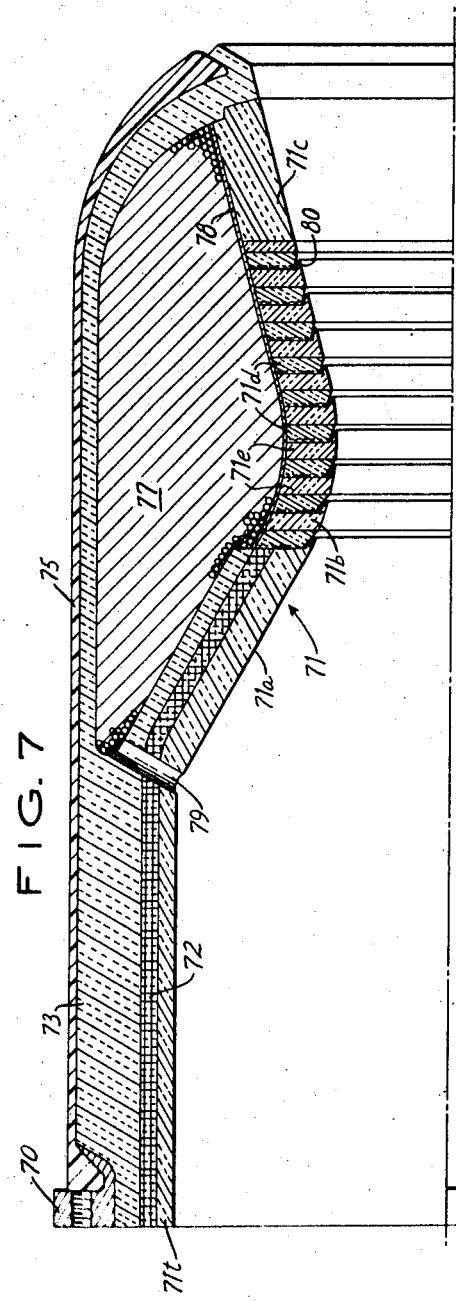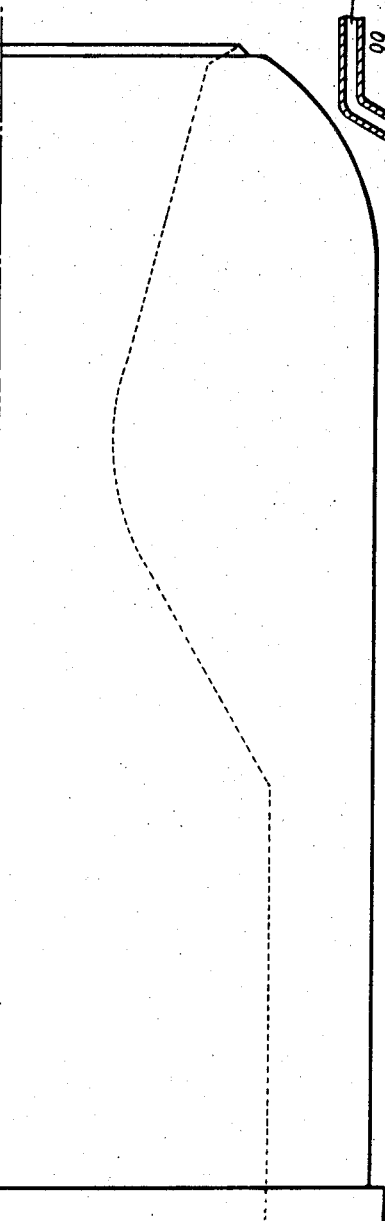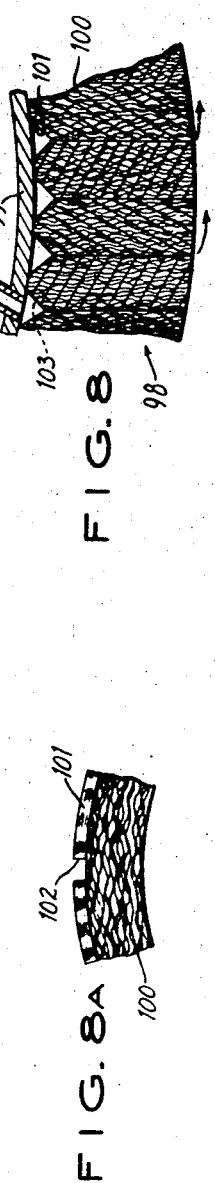

COOLING TECHNIQUES FOR HIGH TEMPERATURE ENGINES AND OTHER COMPONENTS

This application is a continuation of Ser. No. 588,779, filed Oct. 24, 1966 and now abandoned, which in turn is a division of 273,265, filed Apr. 12, 1963, now U.S. Pat. No. 3,305,178.

This invention relates to cooling techniques for high temperature engines, particularly rocket engines. The invention is especially adapted to the effective cooling of high performance rocket engines having combustion product temperatures exceeding by a substantial margin the melting points of even the most rugged refractory metals.

While the invention will be described in terms of cooling techniques and nozzle structures for solid and liquid propellant rockets, it should be understood that several of the arrangements and processes according to the invention will have applicability to the cooling of other high temperature components as well.

Technological advances in rocket engine propellants have greatly aggravated the problem of heat exchange in the exhaust section of the engine and particularly in the nozzle portion where heat transfer from the exhaust to the missile structure is maximum. The combustion products of new propellants have temperatures in the range of 8000° F. and hence their use, with the attendant increase in rocket performance, depends vitally on an effective coolant system.

When it is recalled that the best practical refractory metals have melting points several thousands degrees below the exhaust temperatures characterizing these new fuels, it may be readily appreciated that the cooling problem is a complex and vexing one. If refractory metals are to be used then the coolant or heat exchange system must keep wall members formed of these materials at temperatures thousands of degrees below exhaust temperatures. This means that a marked temperature differential will exist, causing massive heat transfer from exhaust to structure and requiring an extraordinary coolant system.

It will also be appreciated upon reflection that the coolant system for a rocket must satisfy certain uniquely severe requirements. Since thrust is in the nature of a precious commodity, weight is obviously at a premium. A system which requires massive structures or more than a small amount of coolant is clearly unacceptable. The system must operate at all expected flight attitudes and over severe ranges of acceleration magnitudes and directions including gravity-free flight. For some applications the system must be capable of discontinuous operation, terminating during in-flight shut down and commencing again with restart. The system must also operate reliably in the presence of high amplitude shock and substantial ambient pressure variations ranging from atmospheric to the vacuum of space. Notwithstanding these requirements, the system must have maximum reliability and must therefore be extremely simple; the lives of operating personnel and the mammoth investment in time and money depend on it.

It is accordingly a principal object of the invention to provide improved heat exchange or cooling techniques for high performance rocket engines and other components operating at high temperatures.

It is a more specific object of the invention to provide techniques for effectively cooling rocket engines having exhaust temperatures well beyond the melting points of known refractory metals, to the end that high performance fuels which generate such temperatures may effectively and reliably be employed.

A still further object of the invention is to provide cooling techniques characterized by the ability to function anew in space after a temporary shut down of engine operation and to provide cooling techniques responsive to engine throttling.

Other objects of the invention are to provide improvements in the heat dissipating abilities of heat exchangers while concurrently effecting structural simplifications thereof such as elimination of double wall structures; to provide a cooling system which contributes to thrust; to provide a system particularly adaptable to larger size rocket engines; to eliminate certain dependencies on ablative techniques; to eliminate the need for external energy sources for preheating and coolant flow control; to eliminate the need for regenerative cooling in liquid propellant rockets together with the attendant pump system complexes; and to improve the control over and predictability of performance of rocket engine coolant systems.

These and other objects and advantages of the invention such as those relating to nozzle fabrication processes will be set forth in part hereinafter and in part will be obvious herefrom, or may be learned by practice with the invention, the same being realized and attained by means of the methods, steps, parts, combinations and improvements pointed out in the appended claims.

Several processes, combinations and structural features individually and collectively describe aspects of the cooling techniques according to the invention, it being understood that the invention consists in the novel parts, constructions, arrangements, combinations, processes and steps herein shown and described. Briefly and generally these include the storage of a metal coolant, initially in solid form, in the annulus between the nozzle liner and outside casing. When the rocket is ignited there is a transfer of heat from the exhaust gas stream to the metal coolant by way of the nozzle liner which functions as a heat exchanger, the coolant being disposed in optimum heat transfer relation with a portion of the liner. Upon melting, the coolant is caused to flow through a plurality of controlled passageways in the nozzle liner to form a succession of thin films which flow downstream within the gas boundary layer adjacent to the liner to provide transpiration and evaporative film cooling. As films originating upstream evaporate, they are replenished by those formed further downstream.

In the illustrated embodiment the coolant flow is controlled by factors including stagnation pressure of the combustion gases, (in liquid propelled engines flow is thus responsive to engine throttling). The coolant is guided at low velocity along the boundary layer of the nozzle throat in paths which include not only axial, but tangential components as well; a rotary component of movement is thus induced which tends to supplement the coanda effect in avoiding direct interaction of the films and the gas stream.

Low mass flow rate of the coolant is provided by the disposition of coolant passageways by their geometry, and by choice of coolant. The latter may comprise a mechanically inert and readily fabricated metal such as aluminum or a binary solution of metals such as aluminum and magnesium; the coolant preferably has a high enthalpy including high heat of vaporization and these properties are effectively translated into substantial heat absorption by the described transpirative and evaporative film techniques.

The high density of the coolant contributes to low volumetric flow rate and with the above mentioned factors and others (high boiling point, high specific heat, low melting point) encourages the coolant to flow as a thin film which may be actually thinner than the nozzle boundary layer and thus isolated to some extent from direct interaction with the gas stream. In addition the film, being constantly replenished, serves to provide a measure of protection for the liner against chemical attack by the more reactive gases in the exhaust stream.

In several processes according to the invention the coolant flow is controlled in such a manner as to leave residual coolant, which freezes during a temporary shut down, in a region of the heat exchanging liner where sufficient heat will be available to remelt this coolant on restart. Thus, utilization of substantially all coolant, and cyclic operation of the coolant system, are provided.

In the processes according to the invention, certain ablative techniques may also be employed in the entrant portion of the nozzle.

Among the structural characteristics of the invention is the use of a special graphite arrangement as the nozzle liner. Illustrated embodiments employ pyrolitic or high density molded graphite formed as a stack of graphite rings or annular members which are loaded in compression in the radial direction by the liquid coolant and dimensioned to define the requisite nozzle contour. The liner is provided with a semi-porous character for transpiration cooling by means of spaces between the rings which define supply channels for the coolant flow. The arrangement is accordingly well suited to exploitation of the cooling processes of the invention, and moreover, facilitates the achievement of desired steady-state temperature conditions within the wall and in the coolant.

The use of graphite permits higher wall temperatures with a resultant minimization of heat flux. Thus less coolant is required. In addition, the graphite provides the desirable characteristic whereby strength increases with temperature.

Refractory metals such as tungsten are difficult to work at room temperature because of their brittleness and high elastic modulus. In an alternative embodiment this problem is overcome by a liner comprising a filamentary or fibrous refractory metal such as tungsten which is compressed into the desired porous shape, e.g., an annular ring. The porosity of the liner material may be readily and carefully controlled and may have metal coolant embodied therein.

The concept of stacking annular members to form the liner results in removal of radial restraint and acts to relieve stresses in the liner; this condition is supplemented by the disposition of the metal coolant as a hydraulic or liquid pressure backing for the liner to accommodate thermal-induced expansion of the graphite rings.

The stack arrangement with its integral channels also offers a convenient way of metering coolant flow so that the coolant required to absorb the heat flux of each ring is properly supplied and so that as coolant film is depleted by evaporation, a regulated replenishment thereof is constantly provided by coolant flowing into the boundary layer via the passageways between the succeeding downstream rings.

In certain applications of the invention, the graphite liner may advantageously be provided with a reinforcement structure.

In several embodiments of the invention the coolant takes the form of a multilayer coil of metal wire wound around the liner. Besides its adaptability to simple low cost fabrication techniques, this arrangement offers the significant advantage of providing readily attained and controlled porosity manifested in the voids between adjacent turns which provide the required clearance volume and required distribution of clearance. As noted below, this coolant configuration provides reduced contact resistance and better utilization of the coolant storage space.

Other features and aspects of the invention which will become apparent upon the description below of certain exemplary embodiments and their illustration in the drawings of which:

FIG. 1 is an elevation view on reduced scale and partly in section illustrating the general outline of a cooled nozzle for a solid-propellant engine.

FIG. 1A is an elevational sectional view on larger scale taken along the lines 1A—1A of FIG. 1;

FIG. 1B is an elevational sectional view on larger scale taken along the lines 1B—1B of FIG. 1;

FIG. 1C is a fragmentary elevational detail view in section illustrating a portion of the structure illustrated in FIGS. 1A, 1B;

FIG. 1D is a fragmentary sectional detail view illustrating a modification in the coolant feed system of FIGS. 1A, 1B;

FIG. 1D is a fragmentary sectional detail view illustrating a modification in the coolant feed system of FIGS. 1, 1A, 1B, 1C;

FIG. 1E is a fragmentary perspective detail view illustrating a portion of the system of FIGS. 1, 1A, 1B, 1C;

FIG. 1F illustrates a modification to the liner of FIGS. 1-3;

FIG. 3 is an elevational sectional view taken along the lines 3—3 of FIGS. 1A, 1B;

FIGS. 4 and 5 are elevational views partly in section and partly schematic illustrating alternate embodiments of the nozzle structure illustrated in the preceding figures;

FIG. 6 is a temperature profile diagram helpful in understanding certain aspects of the invention.

FIG. 7 is an elevational and sectional view of a nozzle-thrust chamber assembly for a liquid propellant rocket.

FIGS. 8 and 8A are fragmentary elevational views of an alternate liner arrangement;

FIG. 8B is a schematic elevational view;

FIG. 8C is a detail fragmentary view, and FIG. 8D an elevational view in section, illustrating the formation and composition of the liner elements of FIGS. 8, 8A; and FIG. 9 is an elevational and sectional view of the nozzle-thrust chamber assembly of FIG. 7 with certain modifications thereto.

Figure 2:
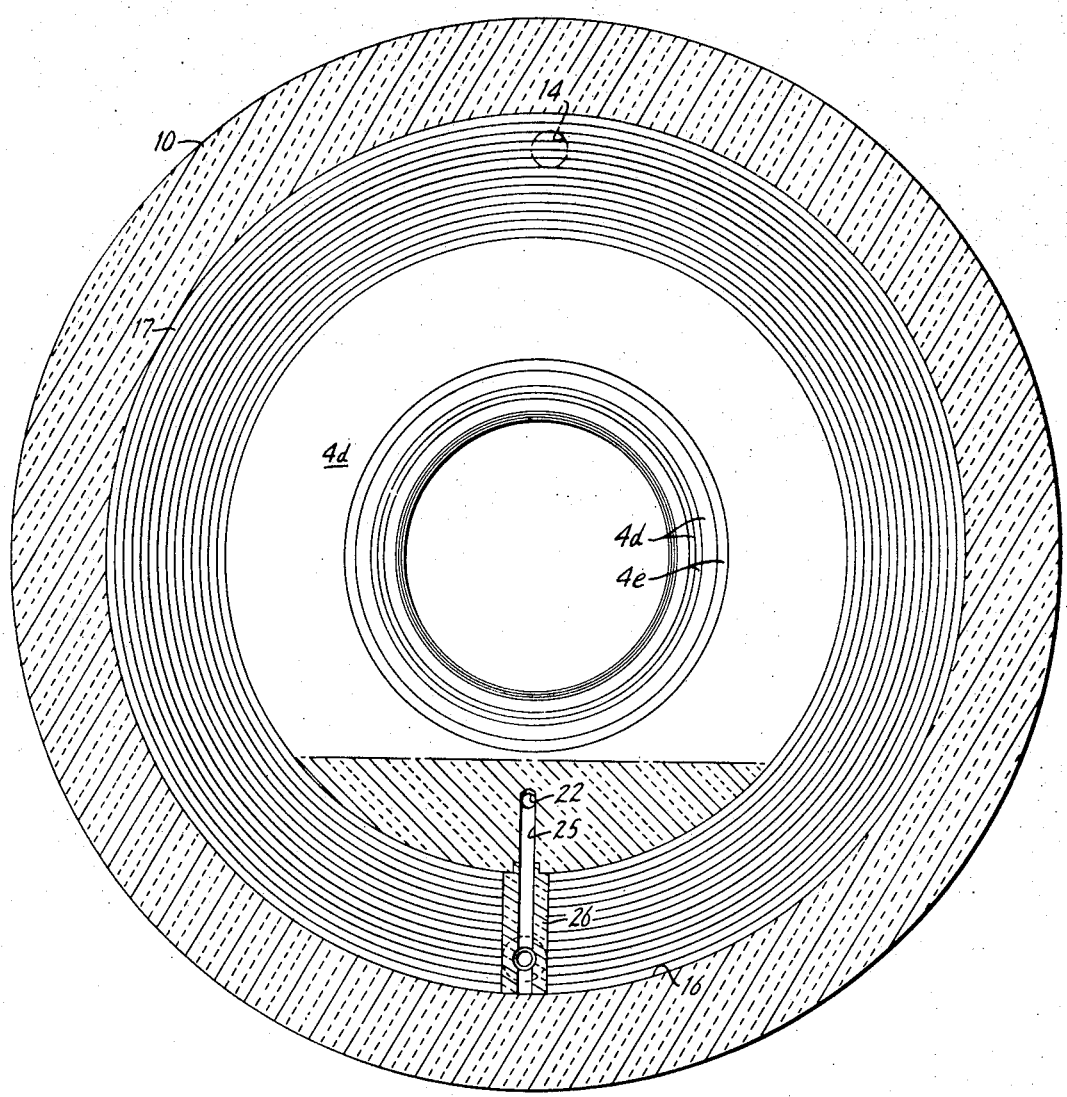
FIG. 2 is an elevational and sectional view taken along the lines 2—2 of FIGS. 1-3.

In the embodiment of FIGS. 1 to 3, the nozzle structure 1 is shown attached to a casing 2 which illustratively encloses a thrust chamber 3. The nozzle structure 1 includes a generally tubular heat exchanging liner 4 having a variable inner diameter for defining the requisite nozzle contour; in the example, this is a converging-diverging or De Laval type nozzle having a converging section in the nozzle entrance 5 which is bounded by liner section 4a, a diverging section in the exit region 6 which is bounded by liner section 4c, and a throat section 7, therebetween, bounded by liner section 4b.

The casing 1 is illustratively formed of two sections including an insulation cover 10 of suitable composition such as an asbestos phenolic and a cap 11 forming a housing which may be of steel. The housing may include a circumferentially grooved flange 12 for facilitating connection of the nozzle as by a lock ring to the case 2 of the rocket structure.

In the entrance region 5, between liner section 4a and cover 10 there is provided a spacer 13 of insulating material such as graphite phenolic cloth tape. Illustratively, spacer 13 includes a rim section 14 seated in a mating annular groove 15 of cover 10.

The space generally defined by the nozzle cover 10 and the liner 4 includes an annular coolant storage area 16 for retaining a metal coolant such as an aluminum alloy embodied as a multi-turn multilayer coil of wire 17. As noted hereinbefore this arrangement avoids excess contact resistance, provides good utilization of the storage space and provides means for effectively controlling the coolant clearance volume and the distribution thereof. Moreover, by coating the wire or by using additional coils integrated in the spaces between coils, further control over coolant behavior may be effected. For example, the potential disadvantage connected with the relatively low vapor pressure of aluminum may be overcome by forming wire 17 of an aluminum alloy which includes another metal, e.g., magnesium, for elevating the net vapor pressure of the resultant binary solution. Alternatively, the coil 17 may comprise aluminum with an additional coil of magnesium disposed in the interstices thereof.

Extending through the inlet section 4a of liner 4 and through spacer 13 is a passageway 14 which communicates with coolant chamber 16. Combustion pressure is thus applied to the chamber for controlling coolant flow as described more fully hereinafter.

The annular liner sections 4a, 4c are formed of high density graphite such as "ZTA" or "CARBONE P–5890." Section 4a, where preservation of geometry is not crucial, is preferably designed to ablate and its length, together with the gases generated by ablation, augments the thickness of the exhaust boundary layer. The high heat of sublimation of the graphite material results in relatively small losses in wall thickness. For relatively large nozzles, sections 4a and 4c may be provided with short duration ablative coating materials which ablate during the initial coolant melt period.

The section 4b of liner 4 comprises a stack of annular graphite members or rings, 4d, 4e preferably formed of pyrolytic or high density graphite and having mating offset portions 19 for registration and stability. Rings 4d and 4e are disposed in alternate interlocked succession, 4e, 4d, 4e, 4d, . . . etc., and may have different outside diameters so as to present greater contact surface area and therefore better heat transfer to coolant 17. The outer peripheries of rings 4d and 4e, together with section 4c may be provided with a layer of thin metal foil 18 also having this effect when it melts.

The inner peripheral face of each member 4d is conveniently beveled to provide a surface $4d_1$ sloping downstream (See also FIG. 1e), while the corresponding inner peripheral face of each member 4e, includes an integral lip $4e_1$ on one edge thereof which is spaced from the adjacent beveled surface $4d_1$. By this arrangement circumferential slots or channels 20 sloping downstream are formed between each annular pair 4e, 4d.

In the upstream face of each member 4d an annular channel $4d_2$ is provided, the open face of which is closed off by the abutting downstream face of the adjacent ring 4e. As may be clearly seen in FIG. 1A, the resultant series of annular passageways or ducts 21 are interconnected to form a coolant outlet header by registered bores 22 in each ring. In addition, the upstream face of each ring 4d is provided with a series of channels or grooves $4d_3$ (See also FIG. 1e), the open faces of which are closed off by the abutting downstream face of the adjacent ring 4e. The channels $4d_3$ are routed angularly of the radial to provide a tangential component therein and serve to interconnect the coolant outlet header 21, 22 with the circumferential slotted outlets 20. Hence coolant supplied to header 21, 22 assumes the form of a stacked series of interconnected annular sheets, each sheet feeding in turn the respective set of skewed channels $4d_3$; each set of channels $4d_3$ jointly feeds in turn the respective annular outlet 20.

The inclination of the slots 20 guides the coolant in the downstream direction while the tangentially inclined channels $4d_3$ superimpose a whirling or vortical motion thereon. Channels $4d_3$ and outlets 20 are dimensioned for proper metering of coolant flow and in addition may be coated alone or together with other surfaces, with a suitable material such as a carbide or oxide to inhibit clogging. Similar means may be adopted, or the coolant composition adjusted, to promote wetting.

As may be seen clearly in FIG. 1A, the leading upstream ring 4d includes a radial bore 25 which communicates with coolant feed pipes 26, 27, preferably of graphite and disposed in the storage space 16. Pipe 27 extends downstream and communicates with a pocket 16a in space 16 at its aft, lowermost point via an inlet port 27a. Hence, the coolant space 16 feeds the liner header 21, 22 from the continuously submerged point where depleted coolant will collect under the action of thrust chamber pressure applied via passageway 14 (FIG. 1B) and the action of gravity and acceleration forces in expected rocket attitudes. As shown in FIG. 1d, feed pipe 27 may include a thermally controlled valve embodied as a plug 27b having a higher melting point than that of the coolant whereby coolant flow is delayed until it reaches a temperature above its melting point.

In certain cases, the liner 4 may require structural reinforcement such as shown in FIG. 4 where the liner is backed by a refractory metal reinforcement 31.

The described nozzle structures may be fabricated as follows: In an exemplary process, the liner 4 is fabricated by assembling the pre-machined rings 4d, 4c, the fore and aft liner sections 4a, 4c and the pre-molded spacer 13 in which the bore 14 is provided. Coolant 17, preceded where required by foil 18 or member 31, FIG. 4, may then be wound under tension around the liner with the aid of a mandrel and appropriate jig. Lines 26 and 27 may be applied prior to the winding operation or thereafter following the formation of bores therefor, in the wound coolant. Thereafter insulation cover 10 is applied, preferably by winding a tape form thereof around the coolant coil; the resultant assembly is fitted with cap 11.

Reference may be had to FIGS. 1–3 and FIG. 6 in the following discussion of exemplary operating conditions.

As suggested in the temperature profile of FIG. 6, the operating temperature $T_g$ of the combustion gas is assumed to be 8,000°F and the thrust chamber gas pressure, $P_g$ 1,000 psia. It is also assumed that the specific heat ratio of the gas is about 1.16, the characteristic velocity is 6,600 ft./sec., and the molecular weight of the combustion products is about 21.

Following ignition at a time $t_o$, a first transient interval occurs, lasting until a time $t_1$, which in the example is about 4.1 seconds. At $t_1$, the temperature $T_{w,g}$ at the liner wall — gas interface is calculated to be 4,600°F while the temperature $T_{w,c}$ at the liner wall coolant interface, is 1,250°F. This temperature is slightly above the melting point of the coolant and the coolant starts to melt; the temperature $T_{w,i}$ at the coolant-insulation interface is 190°F.

The second and third intervals may be regarded as steady state since the liner wall temperatures remain substantially constant until the engine is shut down or the coolant substantially depleted. Hence, the heat flux $q'$ will remain substantially constant during these intervals. During the second interval (e.g. 5.1 seconds), the temperature at the coolantinsulation interface will rise to 1,250° F. due to the absorption by the coolant of the heat of fusion. During this second interval ($t_1$ to $t_2$) and during the first interval ($t_0$ to $t_1$), the coolant system is providing heat sink cooling.

At time $t_2$ the third interval commences; all the coolant is liquified and, under the effects of external forces and the pressurization provided by the combustion gas via port 14, FIG. 1B, the coolant commences to flow through lines 26, 27 to the liner header 21, 22, the channels $4d_3$ and out of the slots 20. As noted hereinbefore the coolant is fed to the liner in a manner which provides a generally vortical flow. The coolant film in an exemplary case is less than 0.001 inches and is controlled to be less than the gas boundary layer. Because of the relatively short distance between adjacent slots 20; the problem of film stability is lessened and as previously noted, the rotary component of motion and the coanda effect, together with relatively low axial velocity, results in the film being urged towards the liner wall. These effects may be supplemented by suitable wetting agents where required in the form of a coolant ingredient or a liner coating. At the end of the third interval ($t_3$) all of the coolant is consumed.

In traversing the distance between adjacent slots 20, the coolant film is evaporated but the liner is replenished with film at the succeeding slot where the coolant flow rate is metered to absorb the local heat transfer between channels. Further contributions to cooling by flux reduction may result from a lowering of the heat transfer coefficient at the gas-liner interface due to the presence of the liquid film and because of the presence of the coolant vapors.

The liquid metal will reach the steady state temperature $T_{w,g}$, of the gas-liner interface as it approaches slots 20 and flows along the liner wall. It is preferred that the coolant under these conditions (e.g. $T_{w,g}=4,600°F$) have a vapor pressure higher than the local gas pressure so as to insure complete vaporization and full endothermic utilization of the heat of vaporization. Thus, where aluminum is used as the coolant, it may be deployed as the solvent in a binary solution with a liquid metal solute of higher vapor pressure such as magnesium, the solution having the desired vapor pressure according to Raoult's Law.

In the illustrated example, and based on the geometry of a typical relatively small nozzle, a coolant supply of about 6.8 lbs. will last for a period of about 96 seconds. At lower gas pressure, the coolant duration will increase, rising in the example to a period of about 250 seconds for a chamber pressure of 300 psia. Decreases in gas temperature, with wall temperatures unchanged, also extend the coolant supply interval. At gas pressures of 1,000 psia and 300 psia, a decrease in gas temperature to 5,500°F will increase the coolant supply duration to 300 seconds and 750 seconds, respectively.

The described operating conditions may include ablation of the liner section 4a and in some cases 4c. Under the assumed conditions, with local flux conditions estimated to be 5 BTU/in.$^2$sec. and with the ablating section comprising a graphite material having a specific weight of 0.063 lb/in.$^3$ and a heat of sublimation of 25,700 BTU/lb, an ablation of one inch will occur in about 320 seconds.

During the described operating conditions, the liner 4 is subjected to various stresses including pressure stresses resulting from the application of thrust chamber stagnation pressure to the coolant side of the liner. This pressure is larger than the internal gas pressure which reduces as the local Mach number increases along the nozzle axis. Hence the illustrated graphite liner is under compression and this condition is favorable in the case of graphite which is stronger in compression than in tension and which becomes stronger as temperature rises.

The graphite members 4d, 4e are free to expand radially since they are backed by the displaceable coolant. Hence thermal compressive stresses on the exhaust side of the liner which are associated with restraint are reduced. Thermal tensile stresses on the coolant side increase. However, pyrolytic graphic has good tensile properties as well and thus the lack of restraint makes better utilization of the material in exploiting its tensile properties while reducing the requirements for higher compressive strength.

In the exemplary operating mode, the liner wall on the coolant side operates at $T_{w,c} = 1250°F$. If the temperature $T_{w,c}$, of the wall can be maintained at a higher value while the exhaust side, $T_{w,g}$, remains the same, thermal stresses will decrease. This may be accomplished by use of thinner liner wall sections. The reduced wall thickness and temperature gradient then cause thermal stresses to decrease to a greater extent than pressure stresses increase. Thus net stress decreases. Furthermore, the increased temperature increases the graphite strength.

To raise the temperature $T_{w,c}$, the coolant flow may be delayed beyond the point where its melting point is reached as by use of the plug 27b, FIG. 1d, which for some applications may be steel. Alternatively, the coolant side of the liner may be provided with a thermal barrier, for example, a coating of suitable material 30 such as zirconium oxide as shown in FIG. 1F. In an exemplary design, the coating is about 0.002 inches thick and has temperatures on the liner and coolant sides of 2,700°F and 1,250°F, respectively.

The techniques according to the invention are especially adapted for application to larger nozzles. For such larger nozzles, analysis will show that requisite coolant volume occupies a portion only of the available annular space. It can also be shown that of the available liner length, only a fraction thereof, e.g., one-third to one-half throat radius, is needed to provide the required heat exchange to melt the coolant. This condition may be supplemented by providing the convergent and divergent liner sections with a short duration ablative coating operable during the coolant melt down period.

Although in larger nozzles the required coolant volume is relatively lessened as is the nozzle length necessary for heat exchange to melt the coolant, a graphite liner in these cases, (e.g. where throat diameter is greater than about 16 inches and chamber pressure is about 1,000 psia) may require structural reinforcement since graphite properties such as thermal conductivity, stress, allowable exhaust side temperature, and gas film heat transfer coefficient act to limit the graphite liner wall thickness. If the wall is too thick the temperature on its exhaust side will continue to rise above acceptable limits before the coolant melts and flow begins.

Schmatically illustrating the foregoing and weight reduction thereby achieved is the nozzle of FIG. 5 which with the exceptions noted is intended to embody the features hereinbefore described. The coolant chamber 40 occupies a relatively small portion of the total available annular space and is confined to the throat section 4b of the liner 4 where the requisite heat exchange is provided. The liner in this embodiment serves primarily as a thermal barrier.

The chamber 40 comprises an annular space formed in the refractory reinforcing structure 41 which also comprises the nozzle casing or cover. In the region of annular members 4d, 4e, the shroud member 41 directly backs the liner but is protected from excess temperature by the coolant flowing between members 4d, 4e. The remainder of the liner including divergent section 4c and convergent section 4a may comprise a graphite phenolic cloth backed by appropriate insulating material 43 followed by reinforcement 41. In the throat section shroud 41 is in compression and may thus include fins 44 which serve as stiffeners and act also as heat transfer elements.

With the coolant chamber confined to the throat region, the expansion cone section 4c is freed of the higher compressive stress which would otherwise occur in this area. This section may also be cooled by radiation in high expansion ratio nozzles to provide further weight reduction, the decrease in internal gas pressure in these cases permitting a thinner shroud.

The embodiment of FIG. 7 illustrates integration of the cooling techniques in the design of a thrust chamber for a liquid propellant rocket. The structure includes a single integrated flange 70 facilitating connection of the chamber to the injector of a liquid propellant non-regeneratively cooled rocket. With exceptions hereinafter noted, the cooling operations and assembly techniques are similar to those described hereinbefore.

The embodiment of FIG. 7 includes a liner 71 having a thrust chamber section 71t, convergent section 71a, throat section 71b and diverging exit section 71c. The leading sections 71t, 71a are designed to ablate and are backed by an insulating layer 72 which may be of graphite phenolic cloth having vent holes (not shown) and which, through its low thermal conductivity, insures a low temperature at the outer insulation jacket 73. The latter may comprise an asbestos phenolic material molded around liner 71 and backing 72.

Serving as a housing as well as the means for retaining flange 70 is the cover 75. This cover is preferably of fiber glass filament wound construction and provides good structural backing for the liner materials. Instead of serving additionally to secure flange 70, the latter may be discarded and the fiber glass continued over a suitable portion of the injector.

The annulus between liner sections 71c, 71b, 71c and insulation jacket 73, comprises the coolant storage area 76 for storing coolant 77 which may be as in the previously described embodiments. Additionally, structural reinforcement 78 may be provided.

The chamber 76 is pressurized by thrust chamber pressure via a passageway 79 bored through the liner 71 at the upstream edge of convergent section 71a, and through the contiguous sections of backing 72 and jacket 73. In addition to eliminating the pump requirements of regeneratively cooled systems, this arrangement insures proper operation in vacuum conditions.

Liner section 71b comprises a stack of annular or ring members 71d, 71e arranged in an alternating pattern 71d, 71e, 71d, 71e, . . . , etc., as described hereinbefore. The liner may include an integral header and feed such as 21, 22, 26, 27 in previously described embodiments. In a gravity free, vacuum condition the absence of drag insures constant acceleration during engine operation and the liquid coolant surface will lie generally normal to the thrust axis and recede downstream. In a gravitational field at low thrust levels the liquid surface more nearly parallels the thrust axis.

In an exemplary application of the system of FIG. 7 where gas temperature is 8,000°F and thrust chamber pressure 300 psia, a cooling period of about 360 seconds may be realized under full thrust conditions of 3,750 pounds, with an aluminum-magnesium coolant of about 33 pounds. At 1,000 psia, 24 pounds of coolant would be required for a 360 second duration while 33 pounds of coolant would increase the cooling period to 480 seconds. Since the liquid metal coolant is ultimately discharged with the jet stream it contributes to thrust, and thus only a fraction thereof need be regarded as inert.

The system of FIG. 7 also functions effectively at reduced throttle. As throttle is reduced chamber pressure decreases; the required coolant flow rate decreases more rapidly than the actual flow rate so that adequate coolant during reduced throttle is insured.

Duration of coolant supply increases for reduced throttle conditions. For example, operation at one-tenth full throttle extends the coolant duration to 19 minutes and if the coolant system were designed to this specific value, the cool-ant duration would be 38 minutes. The above performance may be improved by replacing the wire wound metal coolant with a cast metal configuration.

The system of FIG. 7 offers major advantages over conventional refractory metal, regeneratively-cooled arrangements. The weight, density, and costly and difficult working of refractory metal sand their complicated double-wall structures are eliminated, as is the conventional pump plumbing. Also eliminated is the need for the larger pump systems which would be required to satisfy cooling functions at high temperatures such as 8,000°F. In addition, the increasing availability of coolant space with increased nozzle size renders the systems according to the invention particularly adapted to larger size rockets.

Stop-restart capability in liquid metal cooled systems presents serious and unique problems. As the coolant is depleted, the residual supply is urged in any of several directions depending on the flight program. Following an engine shut down the residual metal coolant freezes; crystals are formed adjacent the lowest temperature area and grow progressively from this surface. The resultant solid mass may not be in proper heat exchanging relationship with the liner either because it is not in contact with the liner and/or, although in contact, it has been so depleted that sufficient surface area of coolant is not available for the necessary heat exchange.

If these conditions exist overheating and burnout can occur in the nozzle. To overcome these difficulties and to provide reliable stop-restart capability under the conditions of gravity-free flight or vertical flight in a gravitational field, the system of FIG. 9 may be employed.

As seen therein, the coolant storage volume is divided into a plurality of chambers or enclosures 76, 76v by means which illustratively comprise an annular divider 80 coaxial with the thrust axis. Chamber 76v confines residual coolant to the area 71b of liner 71 where heat exchange is maximum and this enclosure is fed from the main supply chamber 76 as by a longitudinal tube 81 which is preferably of molybdenum. Tube 81 has an outlet 81a which communicates with residual chamber 76v via an orifice 80a in divider 80 and an inlet 81b located in the after section of main chamber 76.

Prior to initial take off, both enclosures 76 and 76v are provided with coolant. Since the control over coolant porosity provided by winding the same in wire form is not available after the coolant has been once melted, this arrangement may be replaced by a coolant which is pre-cast during fabrication or added in molten form through suitable aperture.

Upon initial engine firing, the coolant 77v in chamber 76v first melts followed by the main mass of coolant 77. Coolant flows through channels 71f between the members 71d, 71e, from the enclosure 76v to the liner slots 90. This supply is constantly replenished and enclosure 76v maintained with coolant from the main supply 77 via 81b, 81, 81a and 80a.

Under the assumed flight conditions the main coolant supply 77 will recede toward the aft end of the nozzle with its surface generally normal to the thrust line; the residual enclosure 76v will remain filled.

Following engine shut down both supplies 77 and 77v will gradually freeze. Although liner 71 is at a relatively high temperature, cooling thereof is effected due to evaporation of the coolant which occurs when local gas pressure in the nozzle falls to ambient levels. This effect, together with the insulating properties of the jacket 73 which inhibits heat transfer, promotes the formation of crystals of coolant 77v along the liner 71. Contraction and shrinkage tend in the direction of the liner and the overall effect is to leave the frozen coolant in satisfactory heat transfer relation with the liner notwithstanding some voids will occur in various regions of the coolant mass.

Following engine restart, the rise in nozzle temperature liquefies the coolant progressively, starting with the portion directly contiguous the nozzle throat. Until the main supply 77 is melted, pressurization via port 79 is ineffective. However, combustion pressure is applied to coolant chamber 76v via the leading channels 71f. When the supply 77 has melted, the cooling operation stabilizes.

FIGS. 8 through 8D illustrate techniques involving the formation and application of a porous refractory metal, such as tungsten, as the liner material. This material forms a nozzle liner 98 on a primary refractory backing 99. As in previously illustrated configurations, liquid metal coolant is deployed in contact with backing 99.

In the illustrated embodiment the elements of the liner 98 each comprise a porous annular ring 100 having the edges of its outer perimeter bevelled to form a series of annular channels 101 between adjacent elements. Each element also has at least one longitudinal notch 102 formed in its outer periphery whereby, with the elements stacked and the grooves 102 aligned, a header channel 103 is formed. This channel links the annular manifolds 101 for coolant distribution to the elements. A coolant feedback system including a coolant tubular inlet 105 communicates with the distribution system 101, 103, by way of an opening in the primary liner structure 99.

An exemplary method of forming the elements 100 is illustrated in part in FIGS. 8B, 8C and 8D. Initially, a refractory wire 109 such as tungsten is woven or knitted to form an appropriate configuration such as the generally cylindrical knitted stockinette 110 shown in FIGS. 8B and 8C. This structure may then be partially compressed as by rolling the ends of the stockinette towards the middle to form the double toroidal structure 111 shown in FIG. 8D. This structure may then be compacted or compressed in a suitable die to form the annular rings 100. The press forming operation provides the required nozzle contours and may also impress the necessary bevels and grooves 102.

The porosity of the liner elements permits coolant to flow through the mass thereof from the coolant supply system to the exhaust side of the liner wall whereby transpiration and evaporative film cooling is implemented.

Control over the porosity of density of the annular rings 100 is controllable according to the nature or pattern of the knitting or weaving, the wire diameter and the degree of pressing. Where required the liner elements may also be formed with additional coolant flow channels and the radial thickness of each element adjusted in accordance with the porosity required at the position the element occupies along the liner wall. The density may also be adjusted by the insertion of segments of refractory metal fibers in the interstices of the mesh.

In the foregoing arrangement it is preferred that metal coolant be supplied integrally with the liner elements. This may be accomplished by a number of methods such as weaving coolant wire 115, FIG. 8C, into the refractory mesh, by adding the coolant in powder form prior to the pressing operation, by submersion of the liner elements in a bath of the coolant, or by wrapping the coolant in foil form around the rolled stockinette prior to the compacting or pressing operation.

The illustrated and described techniques have been shown by way of example. MOdifications will undoubtedly occur to those skilled in the art. The invention is accordingly not limited to the specific techniques shown and described but departures may be made therefrom within the scope of the accompanying claims without departing from the principles of the invention and without sacrificing its chief advantages

I claim:

1. The combination of a rocket engine nozzle having a thrust chamber and a nozzle liner, and a source of liquid metal coolant for the cooling of said nozzle and said nozzle liner, comprising
    a. a nozzle housing defining a cavity surrounding said liner;
    b. a fusible metallic coolant in the form of a multi-turn, multi-layer coil of metal surrounding said liner contained within said cavity and in such fusibly thermal relationship therewith as to fuse during operation of said engine to form a liquefied metallic coolant;
    c. means for conducting said liquefied fused metallic coolant from said cavity to said nozzle liner;
    d. means for directionally dispersing said fused metallic coolant over the surface of said nozzle liner; and
    e. pressure transmitting means for operatively coupling said thrust chamber and said cavity to enable the chamber pressure in said thrust chamber to act within said cavity upon said liquefied fused metallic coolant to cause said coolant to flow through said conducting means and said dispersing means.

2. The combination of claim 1 wherein said coolant comprises the combination of two metals oriented and configured to fuse to form a binary solution during engine operation and selected to provide when fused the required vapor pressure at the operating temperature of said nozzle to effect cooling.

3. The combination of claim 1 wherein said coolant comprises solid lengths of an aluminum alloy.

4. The combination of claim 1 wherein said coolant comprises an alloy of aluminum and magnesium in wire form.

5. The combination as described in claim 1 further comprising an annular divider contained within said cavity and coaxial with the thrust axis of said engine, said divider defining a chamber within said cavity capable of positioning coolant in constant thermal relationship with said housing.

* * * * *